J. V. WOODWORTH.
NUT LOCK.
APPLICATION FILED JUNE 30, 1921.
1,429,180.
Patented Sept. 12, 1922.
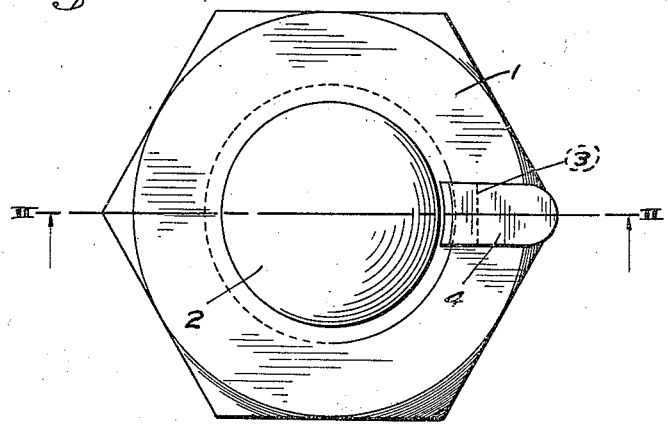
Fig. 1.
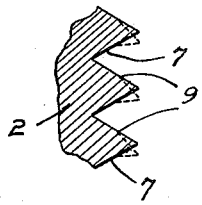
Fig. 3.
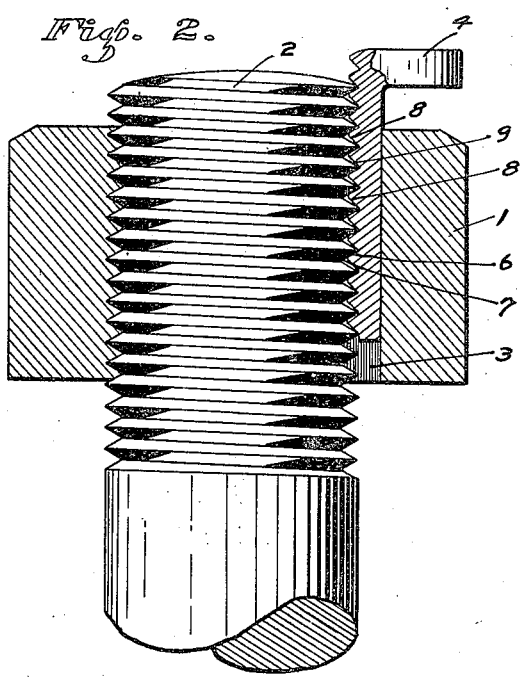
Fig. 2.
INVENTOR.
JOSEPH V. WOODWORTH.
BY
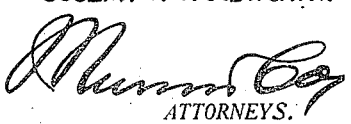
ATTORNEYS.

Patented Sept. 12, 1922.

1,429,180

UNITED STATES PATENT OFFICE.

JOSEPH V. WOODWORTH, OF CAMP KEARNEY, CALIFORNIA.

NUT LOCK.

Application filed June 30, 1921. Serial No. 481,625.

*To all whom it may concern:*

Be it known that I, JOSEPH V. WOOD-WORTH, a citizen of the United States, and resident of Camp Kearney, county of San Diego, and State of California, have invented a new and useful Nut Lock, of which the following is a specification.

The present invention relates to improvements in nut-locks and its particular object is to provide a nut-lock that will positively lock the nut on the bolt or screw it is secured to by bending parts of the threads it comes in contact with out of shape, so that it is impossible for the nut to be turned on the screw or bolt in either direction.

I preferably attain this object by the mechanism illustrated in the accompanying drawing, in which Figure 1 shows a plan view of a nut and a bolt having my locking device attached thereto. Figure 2 a sectional view taken substantially along line 2—2 of Figure 1 and Figure 3 an enlarged sectional detail view illustrating the action of my nut-lock.

Referring to the drawing in detail, it will be seen that the nut 1 screwed on the bolt 2 is provided with a longitudinal key-way 3 in its inner surface. In the drawing the keyway is shown as extending throughout the nut. This, however, is not essential for some of the features of my invention and I therefore will not confine myself in any way to a keyway extending throughout the nut.

In this the key-way the key 4 is adapted to fit, its inner surface being threaded so that the bottoms of its threads can be brought into circular alinement with the bottoms of the threads of the nut and mesh with the top of the threads of the bolt or screw. The cross-section of the key threads, however, does not coincide with that of the nut threads, as is clearly shown in Figure 2. Calling the two edges of the teeth forming the threads the forward and rear edge with reference to the direction of travel when the nut is screwed on, it will be seen that only the rear edge 6 of each key-thread is alined with the rear edge of each nut-thread and therefore fits snugly on the front edge 7 of the corresponding bolt-thread, while the front edge 8 of each key-thread rises from the bottom at a smaller angle than the front edge of the nut-thread and therefore does not fit on the rear edge 9 of the corresponding bolt-thread but lies in a plane cutting the said rear edge plane at a rather sharp angle.

It will be seen immediately that this formation of the key-threads has a decided advantage over the ordinary formation, in which the key threads completely register with the bolt threads, if the locking possibilities of both devices are considered. For my key allows the operator to bend each thread of the bolt that is in contact with the key out of shape by a slight tap with a hammer on the head of the key, which will cause each thread to assume the shape indicated in dotted lines in Figure 3. This result, it will be seen, could not possibly be obtained if the key-threads had the same cross-section as the nut-threads, because a slight tap would not have any noticeable effect and a harder tap would have a tendency to shear the threads, probably along the center-line between the bottom and the top of each tooth.

With my key the nut and bolt can be locked and unlocked practically at pleasure. If it is desired to have the nut locked to the bolt permanently, a rather heavy blow on the key will change the shape of the bolt-teeth to such an extent that there is no possible chance for the nut to come loose. If a mere temporary locking is desired, a light tap will do. In either case it is possible to unlock the device by forcing the key in the opposite direction. Since in this case the rear edge is the one that comes in operative contact with the front edge of the bolt, a tap on the key in the opposite direction will restore the threads to their normal shape and allow the nut to be removed. If the key is not tapped too hard, the same bolt and nut and key can be used a considerable number of times.

While in my description and in the drawing I have used a nut and bolt by way of illustrating my invention, it is understood, of course, that I do not wish to confine myself to this particular embodiment of the principle involved, but wish to be protected broadly on any mechanism where my idea can be used to advantage, that is, wherever an internal thread on one object is in engagement with an external thread on some other object.

It will also be readily understood that it does not make any difference whether the key-way is in the nut or in the bolt and whether the key engages the internal or the external thread and that I therefore wish to cover both possibilities.

I claim:

1. In means for locking an object having an internal thread therein to another object having an external thread registering with said internal thread, means for bending the tops of one of said threads over a limited longitudinal area after the said threads have become engaged.

2. In means for locking an object having an internal thread therein to another object having an external thread registering with said internal thread, a longitudinal key-way in one of those objects and a key fitting in said key-way adapted to engage the threads of the other object over a limited longitudinal area and to be actuated to bend the tops of said threads after the internal and the external threads have become engaged.

3. In means for locking an object having an internal thread therein to another object having an external thread registering with said internal thread, a longitudinal key-way in one of those objects and a key fitting in said key-way having a plurality of teeth thereon adapted to engage the threads of the other object over a limited longitudinal area and to bend the tops of said threads after the internal and external threads have become engaged.

4. In means for locking an object having an internal thread therein to another object having an external thread registering with said internal thread, a longitudinal key-way in one of those objects, and a key fitting in said key-way having a plurality of teeth thereon adapted to engage the threads of the other object over a limited longitudinal area so that the rear edge of each tooth lies snugly on the front edge of the thread engaged, while the front edge of each tooth slants away from the rear edge of the thread engaged by it, whereby each front edge of each tooth is adapted to bend the top of each engaged thread when said key is forced forward in the key-way.

5. In means for locking an object having an internal thread therein to another object having an external thread thereon registering with said internal thread, means adapted to selectively bend and straighten the tops of one of said threads over a limited longitudinal area after said threads have become engaged.

6. In means for locking an object having an internal thread therein to another object having an external thread thereon registering with said internal thread, a longitudinal key-way in one of those objects and a key fitting in said key-way adapted to engage the threads of the other object over a limited longitudinal area and to be actuated to selectively bend and straighten the tops of said threads after said internal and external threads have become engaged.

7. In means for locking an object having an internal thread therein to another object having an external thread thereon registering with said internal thread, a longitudinal key-way in one of those objects and a key fitting in said key-way having a plurality of teeth thereon adapted to engage the threads of the other object over a limited longitudinal area and to selectively bend and straighten the tops of said threads after the internal and external threads have become engaged.

8. In means for locking an object having an internal thread therein to another object having an external thread thereon registering with said internal thread, a longitudinal key-way in one of those objects and a key fitting in said key-way having a plurality of teeth thereon adapted to engage the threads of the other object over a limited longitudinal area so that the rear edge of each tooth lies snugly on the front edge of the thread engaged, while the front edge of each tooth slants away from the rear edge of the thread engaged by it, whereby each tooth is adapted to selectively bend or straighten the top of each engaged thread as said key is forced forward or backward in the key-way.

JOSEPH V. WOODWORTH.